April 15, 1930.  C. WOLF  1,754,732

ELECTRICAL VOLTAGE REGULATOR

Filed April 6, 1928     2 Sheets-Sheet 1

Inventor:
Charles Wolf
By
Owen W. Kennedy
Attorney

April 15, 1930.  C. WOLF  1,754,732
ELECTRICAL VOLTAGE REGULATOR
Filed April 6, 1928  2 Sheets-Sheet 2

Inventor:
Charles Wolf
By Owen W. Kennedy
Attorney

Patented Apr. 15, 1930

1,754,732

UNITED STATES PATENT OFFICE

CHARLES WOLF, OF WORCESTER, MASSACHUSETTS

ELECTRICAL VOLTAGE REGULATOR

Application filed April 6, 1928. Serial No. 267,912.

My invention relates to the regulation of the generated voltage of an electric power distribution system, and has for its object to provide an improved device for automatically regulating the voltage across the supply mains of such a system to compensate for changes in voltage resulting from varying load conditions in the power consumption circuits.
My invention is characterized by the utilization of a speed responsive device whose operation is entirely dependent upon the voltage across the supply mains of the system, the speed responsive device operating to vary the degree of field excitation of the supply generator so as to regulate and keep substantially constant the generated voltage for widely varying load conditions in the power consumption circuits. My improved device is extremely simple in construction, with a minimum number of moving parts arranged to function uniformly under all load conditions. The above and other advantageous features of my invention will hereinafter more fully appear reference being had to the accompanying drawings in which—

Figure 1:
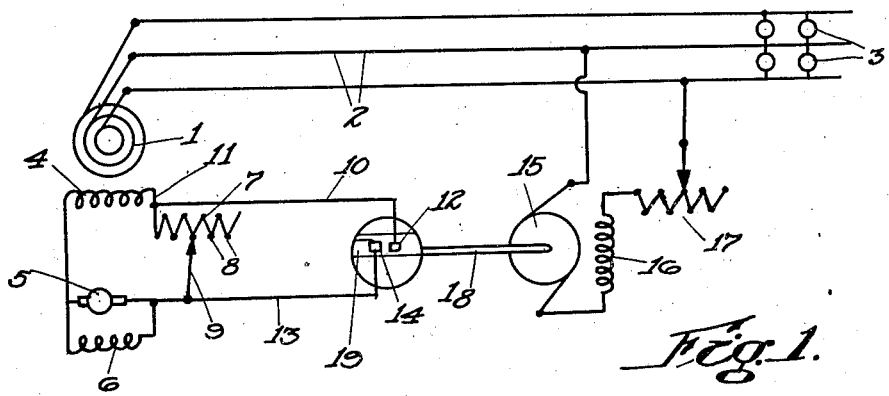
Fig. 1 is a diagrammatic view of my invention embodied in an alternating current distribution system.

Like reference characters refer to like parts in the different characters.

Referring first to Fig. 1, the alternating current supply system in connection with which my invention is used, in one embodiment thereof, comprises an alternating current generator 1 which supplies alternating current to a number of bus bars or supply mains 2 across which are connected current consuming devices 3 representing a varying electrical load on the generator 1. The field winding 4 of the generator 1 is connected at one terminal to one side of the armature 5 of a direct current exciter whose field winding is indicated at 6. The other terminal of the generator field winding 4 is connected to one end of an adjustable resistor 7 ordinarily termed a field rheostat, the resistor 7 providing a number of taps 8 having an arm 9 coacting therewith, by means of which the amount of resistance in circuit with the field 4 can be varied. The arm 9 is in turn connected to the other side of the exciter armature 5 so that the amount of exciting current normally flowing through the field winding 4 is dependent upon the setting of the rheostat arm 9.

In order to short circuit the resistor 7 and to prevent the generator field current from flowing therethrough, a conductor 10 is connected at a point 11 between the resistor 7 and the field 4, which conductor 10 terminates in a contact 12. A second conductor 13 terminating in a contact 14 is connected to the rheostat arm 9 so that should the contacts 12 and 14 be closed the resistor 7 will be short circuited, and an increased exciting current will flow through the field winding 4 with a resulting increase in the voltage across the supply mains 2. Obviously the duration of the engagement between the short circuiting contacts 12 and 14 will determine the length of time that the increased voltage will be maintained and should these contacts 12 and 14 be disengaged, the decreased current flowing through the field 4 then in series with a portion of the resistor 7, will result in a decrease of the generated voltage across the mains 2. I am aware that the above described general method of controlling the voltage of a generator by short circuiting its field resistance is not original with me, and the above explanation is given only for assisting in a complete understanding of my invention which has to do with automatic control of the duration of the engagement, or disengagement, of the short circuiting contacts 12 and 14 by speed responsive means dependent upon the generated voltage across the mains 2.

A regulating motor 15 of the so-called "universal" type has its armature connected across the supply mains 2 with its field 16 in series with the armature and with a regulating resistor 17. It is well known that the speed of a motor of this type varies in accordance with the impressed voltage, within certain limits, and my invention contemplates mounting the short circuiting contacts 12 and 14 so as to revolve with the shaft 18 of the regulating motor 15, the contacts 12 and 14 being either engaged, or disengaged, in accordance with the amount of centrifugal force developed by rotation of the shaft 18. As a result, the duration of the engagement between the contacts 12 and 14, or of their disengagement, is dependent upon the voltage across the supply mains 2.

Figure 5:
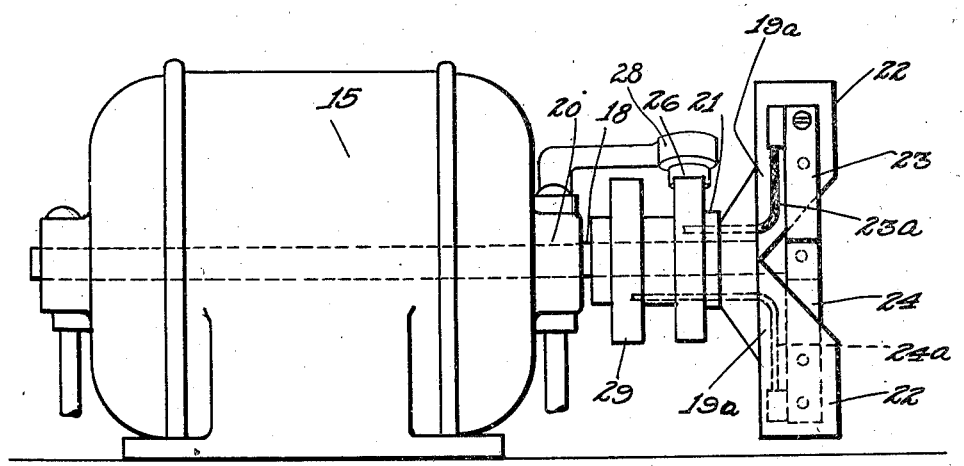
Fig. 5 is a view in side elevation of my regulating device, disconnected from the system under regulation.

As previously pointed out, the motor 15 is of the type whose speed varies with the impressed voltage, within certain limitations, one of which is that the motor will tend to hunt and exhibit some speed variations when running without load. I have discovered, however, that a motor of this type can be caused to operate at a substantially constant speed, for a given impressed voltage, by imposing on the shaft 18 of the motor what might be termed a constant non-frictional load such as that represented by a fan element 19, and I have also discovered that with a load of this type the speed of the motor will vary absolutely in response to very small changes in the impressed voltage. Furthermore, by my invention I have incorporated the short circuiting contacts 12 and 14 in the fan element 19 so that the contacts 12 and 14 are nicely balanced as regards the effect of centrifugal forces thereon and are extremely sensitive in their reaction to changes in the speed of the shaft 18. However before proceeding with further discussion of the functioning of contacts 12 and 14 in controlling the voltage of the generator 1, the construction of the fan element 19 will be described in detail with reference to Figs. 5 and 6.

Figure 6:
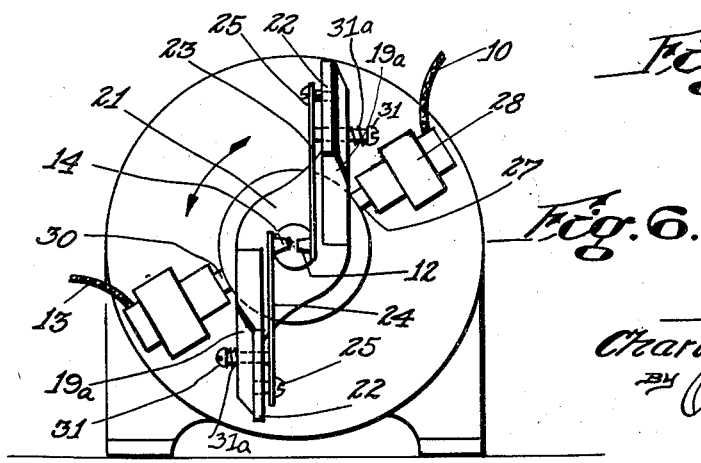
Fig. 6 is a view in front elevation of the device shown in Fig. 5.

The shaft 18 of the motor 15 is extended considerably beyond one bearing 20 and carries a cylindrical hub 21 supporting the fan element 19. The latter comprises two radially extending arms 19ª each terminating in a vane 22, the arms 19ª being symmetrical about the axis of the shaft 18 although offset with respect to a plane containing the axis of the shaft 18 as indicated in Fig. 6. The fan arms 19ª carry resilient fingers 23 and 24 secured to the arms by screws 25 with the free ends of the fingers 23 and 24 carrying the contacts 12 and 14, respectively as shown in Fig. 6. The finger 23 is connected by a lead 23ª to a slip ring 26 carried on the hub 21, with which ring 26 engages a brush 27 received within a suitable holder 28 carried by the bearing 20. The other contact finger 24 is connected by a lead 24ª to a second slip ring 29 with which engages a brush 30, not shown in Fig. 5. The brushes 27 and 30 are respectively connected to the conductors 10 and 13 which, as shown in Fig. 1, are adapted to short circuit the field resistor 7 with the contacts 12 and 14 closed.

As shown in Fig. 6 the fingers 23 and 24 are adapted to hold the contacts 12 and 14 in engagement when the motor 15 is not running, but when the motor 15 attains a predetermined speed at a given voltage across the mains 2, centrifugal force acting on the fingers 23 and 24 causes the contacts 12 and 14 to separate slightly and this condition will be maintained so long as the voltage remains constant due to the stabilizing action of the fan blades 22. If, however, the voltage across the mains 2 should fall due to the sudden increase in the load represented by the power consuming devices 3, the speed of the motor 15 will decrease and the lessened centrifugal effect on the fingers 23 and 24 will permit the contacts 12 and 14 to come into engagement. When this occurs, the field resistor 7 is short circuited with a corresponding increase in the exciting current flowing through the generator field winding 4. The increase of field excitation immediately raises the voltage across the mains 2 and as soon as the motor 15 attains its former speed due to the increased voltage the contacts 12 and 14 will again be separated and the generator field current will be reduced. As the ordinary load on the distributing mains of a power system is constantly fluctuating, the net result is that the voltage variations will cause continuous functioning of the short circuiting contacts 12 and 14. I have found that the resilient arms 23 and 24 are extremely sensitive to changes in the speed of the motor 15, so that a very small drop in voltage will immediately result in engagement between the contacts 12 and 14 with an immediate increase in the generator field excitation to compensate for the voltage drop. This responsiveness is largely due to nature of the load on the motor, to the fact that the contacts 12 and 14 are located substantially on the axis of the motor shaft 18 and that the fingers 23 and 24 are also symmetrical about this axis, so that a very slight variation in the amount of centrifugal force acting on the fingers 23 and 24 will cause engagement, or disengagement, of the contacts 12 and 14.

In order to control the operation of the contacts 12 and 14, an adjusting screw 31 is provided for each finger 23 and 24. Each screw 31 is threaded into the corresponding fan arm 19ª and its inner end is adapted to bear against the contact finger 23 or 24 at a point adjacent to the securing screw 25. By turning the adjusting screws 31 inwardly, the fingers 23 and 24 can be caused to hold the contacts 12 and 14 more closely in engagement so that the motor shaft 18 will have to attain a higher speed than before the adjustment, in order to separate the contacts 12 and 14. Turning the screws 31 outwardly, reduces the contact pressure so that contacts 12 and 14 will separate at a lower speed than before the adjustment. A spring 31ª serves to hold the adjustment of each screw 31.

In the operation of my regulator device, I have found that best results are obtained by utilizing a fan load that is very much greater than the normal frictional load on the motor, represented by the friction of the brushes, bearings and other moving parts. The desired condition of non-frictional loading is readily obtained by setting the contacts 12 and 14 together as previously described, so that the contacts are not separated until the motor has reached such a speed that the fan load predominates over the frictional load. In view of the fact that the fan load varies as the cube of the speed, a very slight increase in the speed of the motor, due to an increase in voltage, will build up the fan load to such an extent that the frictional load becomes a negligible factor in the operation of the motor. With the fan load effective, I have found that a very slight variation in voltage will cause the contacts to be operated and this sensitiveness is largely due to the fact that the centrifugal action which governs the opening, or closing, of the contacts varies as the square of the speed and the non-frictional load represented by the fan. Consequently, a slight variation of voltage while causing only a slight variation in the motor speed, has its effect many times multiplied due to the fact that the fan load varies as the cube of the speed and that the centrifugal action on the contacts varies as the square of the speed and the non-frictional load.

Any tendency for the contacts 12 and 14 to heat up and arc due to the almost continuous make and break at these points is overcome by the blast of air drawn in at the axis of the shaft by the rotation of the fan blades 22, this blast of air keeping the contacts cool, as well as tending to extinguish any arc drawn between the contacts 12 and 14 when carrying a heavy current. In the counterclockwise direction of rotation, the force of the air also tends to press against the surface of the fingers 23 and 24 to aid in their separation by centrifugal force.

Figure 2:
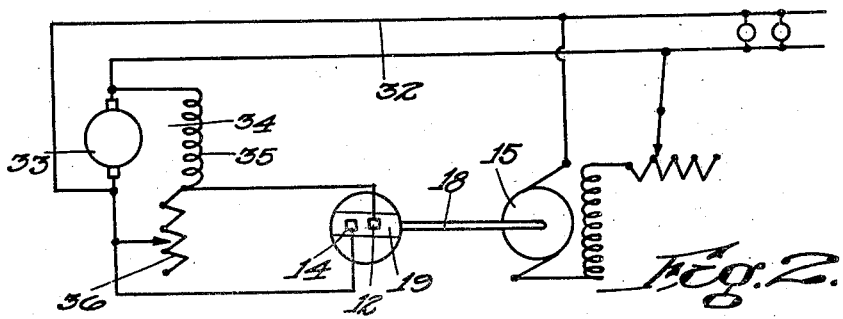
Fig. 2 is a diagram similar to Fig. 1 showing my device embodied in a direct current distribution system.

Referring now to Fig. 2, there is shown the circuit connections for regulating the voltage across supply mains 32 which are connected to the commutator 33 of a direct current generator 34. In this arrangement, the field winding 35 of the generator 34 has one terminal thereof connected directly to the commutator 33 while the other terminal thereof is connected to the commutator 33 through a regulating resistor 36 in the usual manner. With this circuit, the contact 12 is connected between the field winding 35 and the resistor 36 while the contact 14 is connected to the commutator 33 so that when the contacts 12 and 14 are closed, under the conditions previously described with reference to Fig. 1, the field resistor 36 is short circuited to increase the voltage. Obviously the regulating motor 15 carrying the contacts 12 and 14 functions in the same manner when connected as shown in Fig. 2 as previously described with reference to Fig. 1, with the result that the voltage across the direct current supply mains 32 is closely regulated for varying load conditions.

Figure 3:
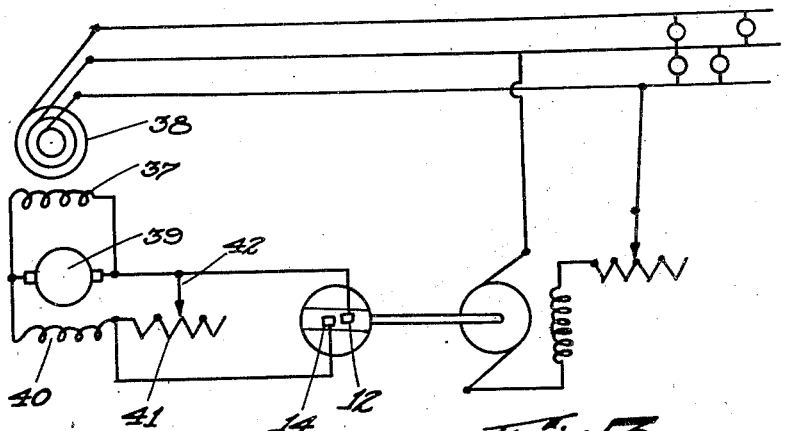
Fig. 3 is a diagrammatic view showing a modification of the arrangement shown in Fig. 1 for an alternating current system.

Referring now to Fig. 3 there is shown diagrammatically an arrangement for controlling an alternating current generator voltage through the exciter instead of directly controlling the generator field as shown in Fig. 1, this scheme being particularly adapted for controlling generators of large capacity with a heavy field current. In this arrangement, the field 37 of the generator 38 is connected directly across the commutator 39 of the exciter and the exciter field 40 is connected across the commutator 39 in series with a regulating resistor 41 and control arm 42. With this connection, the regulating contacts 12 and 14 are connected between the field 40 and resistor 41 and to the commutator 39, respectively, so that closure of the contacts 12 and 14 will short circuit the resistor 41 to increase the voltage generated by the exciter. Obviously this arrangement functions in substantially the same manner as shown in Fig. 1 with the exception that only the exciter field current is handled by the contacts 12 and 14.

Figure 4:
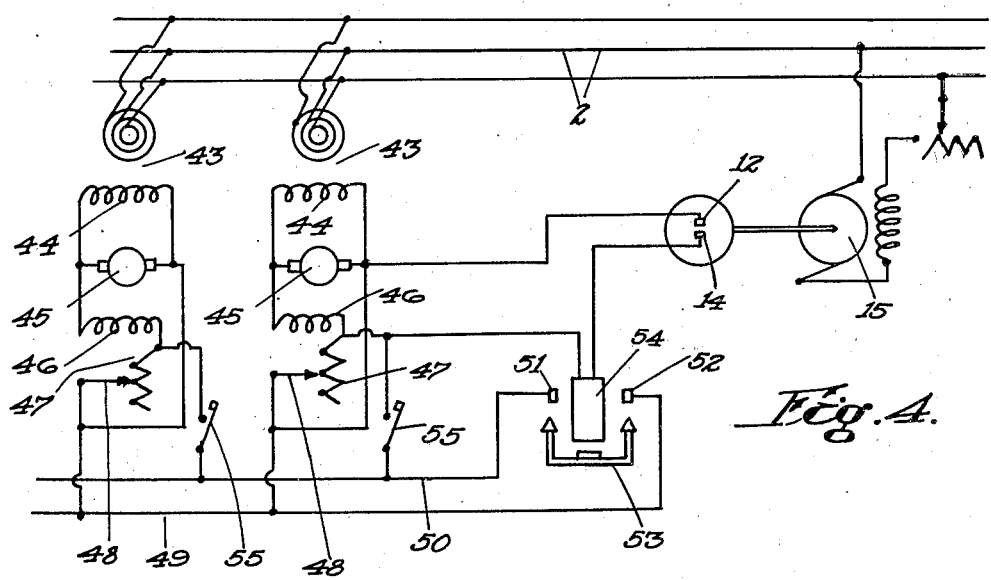
Fig. 4 is a diagrammatic view showing an application of my device for controlling the voltage of a plurality of generators.

In Fig. 4 is shown an arrangement for controlling the voltage of a number of generators 43 connected in parallel across the alternating current supply mains 2, by means of a single regulating motor 15 and contacts 12 and 14. In this arrangement, the field 44 of each generator 43 is connected across its own exciter armature 45 and the field 46 of each exciter is connected in series with a regulating resistor 47 and arm 48, in the same manner as previously described. In order to simultaneously control the voltage generated by all of the exciters, a pair of regulating busses 49 and 50 are provided, the bus 49 being connected in parallel with all of the regulating arms 48. The other bus 50 is connected in parallel with the several junction points between the field 46 and resistor 47 of each exciter. The bus bars 49 and 50 are also connected to the normally open stationary contacts 51 and 52 of a relay device, the armature of which carries a bridging member 53 normally out of engagement with the contacts 51 and 52. The energizing coil 54 of this relay device has one terminal connected to one regulating contact 14 while its other terminal is connected to a suitable source of electrical energy, such as one exciter commutator 45, so that when the contacts 12 and 14 are opened the coil 54 remains deenergized.

When, however, operation of the regulating motor 15 causes the contacts 12 and 14 to be closed, the resulting energization of the relay coil 54 causes the bridging member 53 to bridge the contacts 51 and 52, thereby simultaneously short circuiting the regulating resistors 47 of all the exciters that are connected to the regulating bus bars 49 and 50. If desired, a suitable disconnecting switch 55 may be provided in the lead between each resistor 47 and the bus bar 50, so that any particular exciter may be cut off from the regulating bus bars when the corresponding generator 43 is not in operation.

From the foregoing then it is apparent that by my invention I have provided an improved method of an apparatus for regulating the voltage across the supply mains of an electric power system so that the voltage of each generator, or all the generators, as the case may be, will be kept substantially constant irrespective of variations in the load represented by the power consuming devices. Obviously my improved regulator is susceptible of a wide range of application as it is equally effective in controlling the field excitation current of a generator directly, or in controlling the exciter voltage of one or more generators. My device is particularly characterized by its simplicity, the number of moving parts being reduced to a minimum with a resulting reliability in operation.

I claim:

1. In a voltage regulating apparatus, a power supply circuit, a generator supplying said circuit, a field circuit for said generator, means for varying the value of the strength of the generator field including a pair of relatively movable yieldingly supported contact members and a rotary element with said contact members symmetrically disposed thereon with respect to the axis of rotation of said element and with both of said members movable away from each other in response to an increase in the centrifugal force developed by the rotation of said element.

2. In a voltage regulating apparatus, the combination with a power supply circuit, a generator connected thereto, a field circuit for said generator, relatively movable contact members yieldingly supported and means for varying the value of the strength of the generator field in accordance with the duration of the engagement, or disengagement, of said relatively movable contact members, of an electric motor connected to said supply circuit and having said contact members mounted on the shaft thereof, with both of said members movable away from each other in response to an increase in the centrifugal force developed by the rotation of the motor shaft.

3. In a voltage regulating apparatus, the combination with a power supply circuit, a generator connected thereto, a field circuit for said generator, relatively movable contact members yieldingly supported and means for varying the value of the strength of the generator field in accordance with the duration of the engagement, or disengagement, of said relatively movable contact members, of an electric motor connected to said supply circuit with the speed of said motor directly responsive to variations in the voltage of said supply circuit and means rotatable with the shaft of said motor for supporting both of said contact members so as to be movable away from each other in response to an increase in the centrifugal force developed by the rotation of the motor shaft.

4. In a voltage regulating apparatus, the combination with a power supply circuit, a generator connected thereto, a field circuit for said generator, relatively movable contact members and means for varying the value of the strength of the generator field in accordance with the duration of the engagement, or disengagement, of said relatively movable contact members, of an electric motor connected to said power supply circuit with its speed directly responsive to variations in the voltage of said power supply circuit, means for carrying said contact members on the shaft of said motor, with both of said members movable in response to centrifugal force developed by the rotation of the motor shaft and means for providing the shaft of said motor with a non-frictional load which varies directly with the speed of the motor.

5. In a voltage regulating apparatus, the combination with a power supply circuit, a generator connected thereto, a field circuit for said generator, relatively movable contact members and means for varying the value of the strength of the generator field in accordance with the duration of the engagement, or disengagement, of said relatively movable contact members, of a motor connected to said power supply circuit, the speed of which varies directly with the voltage of said supply circuit, means for supporting said contacts symmetrically with respect to the motor shaft with both of said contacts movable in response to centrifugal force developed by the rotation of said motor shaft and means for providing the shaft of said motor with a non-frictional load which varies as the cube of the speed of said motor shaft.

6. In a voltage regulating apparatus, the combination with a power supply circuit, a generator connected thereto, a field circuit for said generator, relatively movable contact members and means for varying the value of the strength of the generator field in accordance with the duration of the engagement, or disengagement, of said relatively movable contact members, of an electric motor connected to said supply circuit with its speed varying directly with the voltage of said supply circuit, a fan device mounted on said motor shaft and means for supporting said contact members on said fan whereby both of said members are movable in response to centrifugal force developed by the rotation of the motor shaft.

7. In a voltage regulating apparatus, the combination with a power supply circuit, a generator connected thereto, a field circuit for said generator, relatively movable contact members and means for varying the value of the strength of the generator field in accordance with the duration of the engagement, or disengagement, of said relatively movable contact members, of an electric motor connected to said supply circuit with its speed varying directly in accordance with the voltage of said supply circuit, a fan device mounted on the shaft of said motor and means carried by said fan supporting said contacts in engagement at the axis of said motor shaft, with both of said contacts movable out of engagement in response to centrifugal force developed by the rotation of said shaft.

8. A voltage regulating device comprising an electric motor having a fan mounted on the shaft thereof, resilient contact fingers carried by said fan at equal distances from the axis of the motor shaft and contacts carried by said fingers adapted to be in engagement at the axis of said motor shaft.

9. A voltage regulating device comprising an electric motor having a fan structure mounted on the shaft thereof, resilient contact fingers carried by said fan at equal distances from the axis of the motor shaft and contacts carried by said fingers adapted to be in engagement at the axis of said motor shaft, said fingers being adapted to move in response to the centrifugal force developed by the rotation of the motor shaft to cause said contacts to separate when the motor reaches a predetermined speed.

10. A voltage regulating device comprising an electric motor having a fan mounted on the shaft thereof, resilient contact fingers carried by said fan at equal distances from the axis of said shaft, contacts carried at the free ends of said fingers adapted to be in engagement at the axis of the motor shaft and means for varying the forces exerted by said fingers to maintain said contacts in engagement.

11. A voltage regulating device comprising an electric motor having a fan mounted on the shaft thereof, resilient contact fingers carried by said fan at equal distances from the axis of said shaft, contacts carried at the free ends of said fingers adapted to be in engagement at the axis of the motor shaft and means for varying the force exerted by said fingers to maintain said contacts in engagement, whereby to control the speed at which sufficient centrifugal force is developed by rotation of the motor shaft to cause said contacts to separate.

Dated this 27th day of March, 1928.

CHARLES WOLF.